United States Patent [19]

Zom et al.

[11] Patent Number: 4,730,021

[45] Date of Patent: Mar. 8, 1988

[54] PROCESS FOR PREPARING AQUEOUS DISPERSIONS OF ACRYLIC-URETHANE GRAFT COPOLYMERS

[75] Inventors: Walter M. W. Zom, Kaatsheuvel; Hendricus C. Goos, Dorst; Johan Stijntjes, Alkmaar, all of Netherlands

[73] Assignee: Polyvinyl Chemie Holland B.V.

[21] Appl. No.: 4,230

[22] Filed: Jan. 5, 1987

Related U.S. Application Data

[63] Continuation of Ser. No. 733,528, May 13, 1985, abandoned.

[30] Foreign Application Priority Data

Jun. 4, 1984 [NL] Netherlands ................... 8401785

[51] Int. Cl.[4] .............................................. C08C 39/00
[52] U.S. Cl. ................................... 524/457; 524/591; 524/555; 525/278; 526/301
[58] Field of Search ................ 524/591, 555, 457; 525/278; 526/301

[56] References Cited

U.S. PATENT DOCUMENTS

| | | | |
|---|---|---|---|
| 4,206,108 | 6/1980 | Simms | 524/591 |
| 4,237,038 | 12/1980 | Pampouchidis | 524/591 |
| 4,320,220 | 3/1982 | Pampouchidis | 524/591 |

FOREIGN PATENT DOCUMENTS 1447400  8/1976  United Kingdom.

OTHER PUBLICATIONS

0098752 European Patent Application 1-18-84.

*Primary Examiner*—Joseph L. Schofer
*Assistant Examiner*—Peter D. Mulcahy
*Attorney, Agent, or Firm*—Brooks Haidt Haffner & Delahunty

[57] ABSTRACT

Ethylenically unsaturated aqueous urethane dispersions of controlled molecular weight are prepared by first reacting an active hydrogen atom containing polymerizable vinyl compound with a diisocyanate to produce a monoacrylated diisocyanate adduct in the presence of excess diisocyanate.

The adduct thus formed, being a nearly selectively made mono-ethylenically unsaturated mono-isocyanate compound, is used in preparing an aqueous urethane polymer dispersion by reacting this adduct with polyisocyanates, organic compounds containing active hydrogen atoms like polyols and polyamines and organic compounds containing at least one active hydrogen atom and at least one group capable of saltformation, followed by neutralizing, dispersing in water and chain-extending the prepolymer.

This ethylenically unsaturated aqueous urethane polymer dispersion is subjected to an emulsionpolymerization by conventional techniques with acrylate, methacrylate and related polymerizable compounds, yielding an aqueous dispersion of an urethane-acrylate graft copolymer.

These urethane-acrylate graft copolymers are particularly useful as binders for coatings, printing inks and related applications.

29 Claims, No Drawings

PROCESS FOR PREPARING AQUEOUS DISPERSIONS OF ACRYLIC-URETHANE GRAFT COPOLYMERS

This application is a continuation of application Ser. No. 733,528, filed May 13, 1985, now abandoned.

The present invention relates to a process for preparing aqueous dispersions of urethane-acrylate graft-copolymers and to the thus obtained stable aqueous dispersions, which may be used in waterborne coatings, printing inks, and related applications.

Until recently almost all coatings were applied as a solution in an organic solvent, which after evaporation left behind the dried coating on the article to be coated like solvent based acrylates and urethanes. In addition other systems were developed, which are in essence reactive compositions, being essentially free of volatile solvents and containing reactive diluents, which react during the curing process to become part of the coating itself like e.g. unsaturated polyesters.

Since the harmfulness of some compounds in these systems (e.g. solvents, reactive diluents, free isocyanates) and their deleterious environmental effects when evaporated became better understood and also the price of organic solvents increased, these systems met with increasing disfavour.

In response, those skilled in the art endeavoured to develop coating systems wherein the use of the harmful compounds mentioned before is avoided. Among the most successful systems are the colloidal and aqueous dispersions, containing only a small amount of solvent or no solvent at all. Very interesting types in this field are the acrylate and urethane based dispersions. Acrylates are known to have e.g. good adhesion on a great variety of substrates, a very good weathering resistance, dependent on the composition also a good resistance to chemicals and hydrolysis, a great variety in raw materials and a good compatibility with various cobinders.

Drawbacks of the acrylates are for example a rather low solids content in application formulas in view of the viscosity correlation and, with respect to the physically drying types, a rather thermoplastic nature which may induce blocking problems.

The urethanes are well-known because of their good mechanical resistance (abrasion, mar, scratch), elasticity/tensile strength, less thermoplastic behaviour than the acrylates, a higher solvent resistance and in the case of two component systems, a higher solids content at lower viscosities in application formulas.

As drawbacks can be mentioned a poorer resistance to weathering (yellowing by UV), hydrolysis and alkaline attack. Urethanes generally are more expensive than acrylates are.

Although many activities were unfolded in the field of urethane-acrylate combinations such as the 2-component and UV-curing systems in view of possible synergetic effects (combining advantages and concurrently reducing the drawbacks), in these systems still disadvantages as solvent emission, limited potlife and the presence of harmful or toxic reactive diluents remain.

Physical combinations of aqueous or colloidal dispersions of both types often will result in unstable formulas.

Objective of the present invention is to provide a process for preparing storage stable, gel free, one component aqueous dispersions of urethane-acrylate graftcopolymers (or related reticulate polymers) coming up to the outstanding properties of the 2-component systems, free of toxic volatile compounds, which can be used in coatings, printing inks and related applications.

The process according to the invention is therefore characterized in that a. a monoacrylated adduct is prepared by reaction of a polymerizable acrylate containing at least one active hydrogen atom with a diisocyanate to produce an essentially monoacrylated diisocyanate adduct in the presence of excess diisocyanate, the NCO/OH equivalent ratio to produce the adduct is 2:1, b. the thus obtained adduct together with other polyisocyanates is reacted with an organic compound containing at least one active hydrogen atom and an organic compound containing at least one active hydrogen atom and a group capable of forming a salt group, said organic compounds having an average isocyanate-reactive functionality of 2, c. the thus obtained prepolymer is neutralized and is dispersed in water, immediately followed by the addition of a chain extender under obtaining a chain-extended acrylated urethane polymer dispersion, and d. the thus obtained dispersion is used in an emulsion-polymerization under obtaining a stable aqueous dispersion of urethane-acrylate graftcopolymer.

The process according to the invention for preparing storage stable aqueous dispersions of urethane-acrylate graftcopolymers has four steps.

In the first step essentially a mono-acrylated adduct is prepared. This preparation is usually carried out in a dry atmosphere by reacting an excess of diisocyanate with a hydroxy-acrylate in an equivalent ratio NCO:OH from 2:1, preferably 10:1 to 30:1 at a temperature of about 0°–130° C., preferably 20°–100° C. Preferably no catalyst is used.

In the second step the adduct (a selectively prepared mono-acrylated diisocyanate compound), prepared in the first step, also in a dry atmosphere together with other polyisocyanates, consisting of the excess and/or additional, whether or not identical polyisocyanate, is reacted with active hydrogen atoms containing compounds, such as polyoles and polyamines, and with compounds having at least one active hydrogen atom and at least one group capable of salt formation in an equivalent ratio of NCO:OH of 1,2:1 to 2,5:1, preferably 1,6:1 to 2,3:1, at a temperature of about 50°–130° C., preferably 80°–95° C. The salt group equivalent weight should be less than 6000, preferably 200–5000, in order to obtain stable dispersions.

To carry out this reaction one may use any of the known catalysts, such as an amine or an organo metal compound, usually a tin compound. The catalyst, if present, is present in any of the conventional and known catalytically effective amounts, sufficient to carry out the urethane synthesis, preferably from 0,001 to 0,1%, by weight.

If required, in the third step the partly acrylated urethane prepolymer, prepared in the second step, is diluted with polymerizable compounds, like acrylate monomers, in order to reduce the viscosity.

For further handling a prepolymer viscosity of about 10–10.000 mPa.s is preferred to achieve a smooth emulsion polymerization as to be described in the fourth step. Thereafter the prepolymer is converted in a salt form by means of a neutralizing agent, preferably a tertiary amine, at a neutralization percentage of about 50–130% on equivalent base. The neutralization is carried out directly in the prepolymer, followed by dispersion in water, or during the dispersion of the prepolymer in a solution of the neutralization agent in water. Immediately thereafter the chainextension occurs according to conventional procedures. The chain extenders to be used may be defined as active hydrogen atoms containing compounds having at least two active hydrogen atom which are more reactive with NCO-groups than with water, preferably primary and secondary organic amines. Also ammonia may be used.

The equivalent ratio between the NCO-groups in the mono-acrylated urethane prepolymer and the active hydrogen atoms in the chain extender should be less than 2:1, preferably 1,0:1 to 1,8:1, to obtain gel-free products. The final chain extended acrylated urethane polymer dispersions should have a solids content of about 20–80%, by weight, preferably 30–40%, by weight.

In the fourth step the mono-acrylated urethane dispersion, which is obtained in the third step, is subjected to an emulsion polymerization with acrylate and/or related monomers, to yield a stable urethane-acrylate graft-copolymer. The choice of the solids ratio between the acrylate and the urethane part in this embodiment is arbitrary, for instance ranging from 95:5 to 5:95.

The final copolymeer dispersion should have a solids content of 30–70%, by weight, preferably 40%, by weight. The emulsion polymerization techniques to be used according to the invention are also well known techniques, wherein the emulsion polymerization is carried out with or without pressure and in an inert or not inert atmosphere.

For the case of description of the subject of the present invention some simplifications have been made, but are not meant as a restriction of the present specification and claims:

The term acrylate is meant as being part of the group acrylates, methacrylates and related polymerizable compounds.

In the equivalent reaction ratios the OH-group is mentioned as NCO-reactive group. Generally this group is meant as being part of the groups containing active hydrogens according to the Zerewitinoff test. Accordingly active hydrogens include hydrogen atoms attached to oxygen, nitrogen or sulfur and thus useful compounds will include those having at least one of these groups: —OH, —SH, >NH, —NH$_2$.

Finally for the active hydrogen containing polymerizable vinyl compounds is read (but not limited to) a hydroxy-functional (meth) acrylate.

In the first step almost selectively a monoacrylated diisocyanate is obtained. Although not limited thereto, it is according to the invention started from aliphatic diisocyanates, since these compounds perform better in coating compositions in e.g. U.V. stability than the aromatic ones do.

For example an adduct based on isophorone diisocyanate (IPDI) and 2-hydroxy-ethyl methacrylate (2-HEMA) showed no free hydroxy-acrylate and only a small amount of diacrylated diisocyanate: generally less than 5% of the total amount of acrylated diisocyanates:

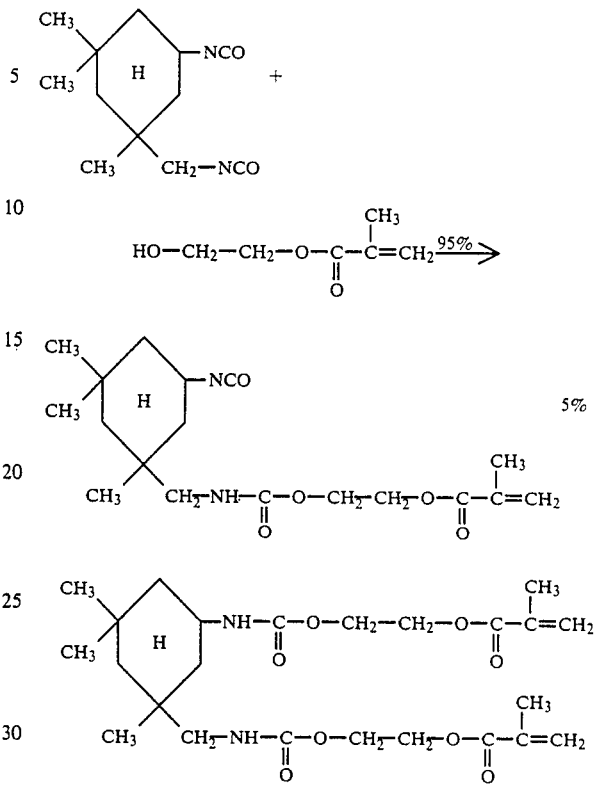

Although in the European Patent Application No. 015.593 was claimed that only at low temperatures and low catalyst concentrations mono-acrylated diisocyanates can be made selectively, according to the invention surprisingly a high degree of selectivity is observed, within a reasonable short reaction time.

In the patent application mentioned was stated that formation of mono-acrylated diisocyanates can be achieved only if diisocyanates are applied showing different reactivities between NCO-groups, the so called "asymmetrical" diisocyanates like IPDI.

Contrary to this statement the inventors surprisingly also succeeded in making mono-acrylated diisocyanates rather selectively by the present procedure; for example with 4,4'-methylene bis (cyclohexylene diisocynate), available from Bayer under the trademark Desmodur W ® and 2—HEMA an adduct was made free from monomeric 2—HEMA and containing no more than 10% of the diacrylated compound on the total amount of acrylated diisocyanates.

In the light of the emulsion polymerization in step four of the present process, this low content of diacrylated diisocyanates is necessary in order to avoid as many as possible crosslinking reactions during the polymerization reaction, as well as to avoid possible instabilities because of gel formation due to the mentioned crosslinking reactions.

Based on the obtained results a wide variety of diisocyanates may be used.

In this respect it should be noted that in the adduct preparation according to the invention preferably diisocyanates should be used. In the use of higher polyisocyanates finally polyurethane chains are formed with random vinyl groups, which may cause gelling because of the cross-linking reactions in the emulsion polymerization step, if the urethane chains contain more than two vinyl groups per chain.

- a diisocyanate: OCN—R$_1$—NCO
- a chain extender: H$_2$N—R$_2$—NH$_2$

- a hydroxymethacrylate: 
$$CH_2=C(CH_3)-C(=O)-O-R_3-OH$$

the structure may be as follows:

1. $H_2N-R_2-NH-\overset{O}{\overset{\|}{C}}-NH-R_1-NH-\overset{O}{\overset{\|}{C}}-[U]_n-O-R_3-O-\overset{O}{\overset{\|}{C}}-\overset{CH_3}{\overset{|}{C}}=CH_2$ 2. $H_2N-R_1-NH-\overset{O}{\overset{\|}{C}}-[U]_n-O-R_3-O-\overset{O}{\overset{\|}{C}}-\overset{CH_3}{\overset{|}{C}}=CH_2$ 3. $CH_2=\overset{CH_3}{\overset{|}{C}}-\overset{O}{\overset{\|}{C}}-O-R_3-O-\overset{O}{\overset{\|}{C}}-NH-R_1-NH-\overset{O}{\overset{\|}{C}}-[U]_n-O-R_3-O-\overset{O}{\overset{\|}{C}}-\overset{CH_3}{\overset{|}{C}}=CH_2$ The application of commercially available active hydrogen atoms containing polymerizable compounds in the stable aqueous dispersions of the invention is limited to vinyl compounds which are monofunctional with respect to the NCO reactive group like hydroxyacrylates, the mono-acrylic acid esters of glycols, like ethylene glycol monomethacrylate (USSR Pat. No. 933,667), or the mono-esters of 2-methylpropylene glycol (Japanese Patent No. (U) 58/049,339). Difunctional compounds like the mono(meth)acrylic acid ester of a trihydric alcohol as 2,3-dihydroxy propylacrylate (U.S. Pat. No. 4,366,301) and cis-2-butene-1,4 diol (J. Pol. Sci., Pol. Chem. 1982, Vol. 20, No. 10, 2879) may be less appropriate since polyurethane chains will result with statistically distributed vinyl groups, having the above-mentioned disadvantages of an increased chance of gellation due to cross-linking reactions in the emulsion polymerization.

The functionality of the reactants in the second and third step is very important for the properties of the acrylated urethane prepolymer and -polymer. If either or both of the reactant types in the prepolymer preparation have a functionality of greater than 2.0 the prepolymer in most instances will be a gel and not be dispersible at all. However, if the average functionality is reduced by using only difunctional reactants or by introducing monofunctional ingredients and in addition the reaction conditions are controlled to limit the molecular weight, a readily dispersible prepolymer will result.

Also in the extension step a chain extender, having an average functionality of greater than 2.0 would probably gel such a high molecular weight product, if used in a stoichiometric amount with the unreacted NCO groups in the acrylated urethane prepolymer. Reducing the average functionality e.g. via introducing monofunctional compounds (to a value ≦2.0) gelling can probably be avoided.

The chain extenders are preferably water-soluble, although water-dispersible materials may be used. Water-soluble chain extenders are preferred because if the prepolymer is only marginally dispersible, a water-soluble chain extender will enhance the water-dispersibility of the final acrylated urethane polymer.

The structure of the extended prepolymer, obtained in step 3., can possess one or two ethylenically unsaturated groups dependent on the reaction conditions, for example when starting from:

where:
U = a repeating unit consisting of reaction products of the diisocyanate with the chain extender or other active hydrogens containing compounds being present during the prepolymer preparation.
n = the degree of polyaddition of the urethane polymer, being equal to zero, unity or a whole number greater than unity.
1 = a mono-acrylated urethane polymer, terminated by a chain extender.
2 = a mono-acrylated urethane polymer, but terminated by the reaction of NCO with water, yielding an amine group.
3 = a diacrylated urethane polymer.

From the mono-acrylated urethane polymers urethane-acrylate graftcopolymers may be formed during the emulsion polymerization (step 4), from the diacrylated urethane polymers urethan-acrylate reticulate copolymers.

Since both the mono- and diacrylated urethane polymers may be expected to be present in practice, a combination of both types of copolymers will result in step 4.

Dissolving the acrylated urethane prepolymer in acrylate monomers, as described in the third step of the procedure of the invention, can be an essential step before carrying out the emulsion polymerization.

Omitting this step in the given procedure may result in unstable aqueous dispersion, containing a considerable amount of gel. Also recommendable in this step is the introduction of a small amount of emulsifier, preferably to be added to the water phase before starting dispersing the acrylated urethane prepolymer into the water phase.

Introduction in a later stage, e.g. between the extension and the emulsion polymerization, may influence the processing negatively. In addition anionic emulsifiers, such as sodium lauryl sulphate, perform better than non-ionic types or combinations of anionic and non-ionic types do.

The process according to the invention results in a smooth processing, thereby yielding low viscous polymer dispersions showing a high degree of acrylate/urethane grafting (i.e. in the form of both graft- and reticulate copolymers): over 90% of the acrylate monomers appeared to be coupled to the acrylated urethane polymer. The grafting efficiency was checked by a soxhlet extraction wherein the graft and/or reticulate copolymers, finally obtained, were subjected to a 24 hours extraction with tetrahydrofuran or isopropylalcohol.

A reference sample consisting of a physical blend of vinyl terminated urethane (polymer dispersion) and an acrylate polymer dispersion with the same overall composition as the grafted copolymer was extracted completely during this cycle.

The preparation of an adduct, consisting of an essentially mono-acrylated diisocyanate, is very essential to obtain a high grafting efficiency between the acrylate and urethane chains. First making a urethane prepolymer and then coupling to a hydroxy-acrylate monomer (or related NCO reactive monomers) appeared to be less effective. Possibly one may use a suitable adduct, which is not prepared in situ.

Since a urethane prepolymer usually contains monomeric diisocyanates—for instance when starting from a NCO:OH equivalent ratio of 2:1, a free diisocyanate content up to 7%, by weight, based on prepolymer, was found—coupling thereof with hydroxy-acrylates will possibly result in a preferred reaction between the free diisocyanate, which shows a higher reactivity. So either the hydroxy-acrylate monomer is coupled to the free NCO-groups of the urethane prepolymer or to the free diisocyanates, in which case the NCO:OH equivalent ratio is very unfavourable: diacrylated diisocyanate may be formed to a larger extent, which can not be incorporated into the urethane chain in the extension step.

In addition these low molecular weight compounds will promote crosslinking reactions during the emulsion polymerization because of their bifunctional unsaturation. Besides, these compounds will detract the film formation.

Testing the procedure, where the hydroxy-acrylate monomer is added to the urethane prepolymer, in a reference sample, however, neither gellation tendencies nor a higher gel content was found, but the grafting efficiency appeared to be poor: less than about 50% of the acrylate monomers was coupled to the acrylated urethane chain.

Also the film formation of this dispersion was poor.

The graft and reticulate copolymers, prepared by the process of the invention, show a good storage stability (tested under various conditions), an excellent resistance to hydrolysis in alkaline medium and a good water and solvent repellancy.

Polymerizable vinyl compounds having a single reactive hydrogen atom (defined according to the Zerewitinoff test), useful in the process of the present invention, are well-known to those, skilled in the art. Illustrative for these compounds one can name hydroxy-functional acrylates, defined by the formula

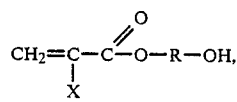

where X is hydrogen or methyl and R is a divalent alkylene having 2 to 6 carbon atoms.

It also includes products such as acrylamides, methacrylamide, N-hydroxymethylacrylamide, N-hydroxymethylmethacrylamide, diethylene glycolacrylate, diethylene glycolmethacrylate and the like, primary and secondary amino group containing acrylate and methacrylate acid esters of the formula:

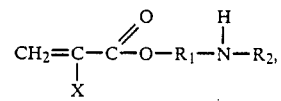

where X is hydrogen or methyl, $R_1$ is a divalent alkylene having 2 to 6 carbon atoms, $R_2$ is hydrogen, methyl or a higher alkyl group, and the like.

The polyisocyanates useful in the process of the invention can be aliphatic, cycloaliphatic and aromatic or mixtures thereof. Aliphatic c.q. cycloaliphatic polyisocyanates are preferred because of a better UV-/weathering resistance in the final application.

In addition, diisocyanates are preferred although also higher polyisocyanates can be used in place of, or in combination with diisocyanates and/or monoisocyanates to achieve an average functionality of 2 in view of possible gel problems when preparing the urethane polymer as described before.

Examples of suitable monisocyanates are cyclohexyl isocyanate, phenylisocyanate, toluene isocyanate, isocyanate-ethylmethacrylate and α,α-dimethyl-meta-isopropenyl benzylisocyanate. Examples of suitable (cyclo-)aliphatic diisocyanates are 2,2,4-trimethyl hexamethylene diisocyanate (TMDI), 1,4-tetramethylene diisocyanate, 1,6-hexamethylene diisocyanate (HDI), isophoronediisocyanate (IPDI), 4,4'-methylene-bis-(cyclohexylene diisocyanate), α,α'-xylylene diisocyanate. Examples of suitable aromatic diisocyanates are toluene diisocyanate, 1,4-phenylene diisocyanate, 4,4'-diphenylmethane diisocyanate, meta or para tetramethylxylene diisocyanates.

Examples of suitable higher polyisocyanates are 2,4,6-triisocyanate toluene, 4,4',4''-triisocyanate triphenyl methane, 1,2,4-benzene triisocyanate, biurets of the diisocyanates and the like.

The active hydrogen atoms containing organic compounds, defined according to the Zerewitinoff test, suitable in the process of the present invention can be aliphatic, cycloaliphatic, aromatic or mixtures thereof. Functional groups according to the Zerewitinoff test are —OH, —SH, <NH and —NH$_2$.

The average functionality is, as mentioned before, important in controlling the tendency of the polymer to gel and should be adjusted to a value of 2, when using higher functional compounds, by monofunctional ones. Examples of suitable compounds include polyols, polyamines, amino alcohols, mercapto terminated derivatives, and the like. The polyols, useful in the process of this invention have an average molecular weight from 60 to 6,000, preferably 2 hydroxyl groups and a hydroxyl number of about 20 to 1,000 mg KOH/g.

Illustrative of such polyols are:

1. aliphatic diols such as ethylene glycol, propane diol, neopentyl glycol, butane diol, hexane diol and the bivalent alcohols with 1,2-alkylene oxide, like ethylene oxide and propylene oxide.
2. cycloaliphatic diols, like 1,4-cyclohexane diol, and 4,4'-dihydroxy cyclohexyl 2,2-propane.
3. araliphatic bivalent alcohols, containing 1 to 2 etheroxy atoms like bis(ethoxylated) Bisphenol A and bis(propoxylated) Bisphenol A.

4. polyether diols, like polyethylene oxide diols, polyethylene oxide propylene oxide diols, polypropylene oxide diols and polytetramethylene oxide diols.
5. polyester diols from the alcohols, mentioned under 1, 2 and 3 and polycarboxylic (preferably dicarboxylic) acids and anhydrides thereof, like maleic acid, fumaric acid, mesaconic acid, citraconic acid, itaconic acid, glutaric acid, adipic acid, isophtalic acid and terephtalic acid.
6. polyols, based on polycarbonates and polycaprolactones.

As suitable polyamines one can mention for instance ethylene diamine, 1,2-propylene diamine, 1,8-methane diamine, isophorone diamine, propane 2,2-cyclohexylamine, N,N'-dimethyl-o-phenylene diamine, N,N'-di-p-tolyl-m-phenylene diamine, p-aminodiphenylamine.

Suitable amino-alcohols and mercapto terminated derivatives are e.g. monoethanolamine, 2-hydroxypropylamine, N,N-bis(3-aminopropyl)ethanolamine, p-aminophenol, β-mercapto ethanol and the like.

The acrylated urethane prepolymer also contains salt groups, such as acid salt groups, which can be selected from the class consisting of $OSO_3^-$, $-OPO_3^=$, $COO^-$, $SO_2O^-$, $POO^-$ and $PO_3^=$.

The prepolymer can be prepared from reactants containing the salt group, or as is more normally the case, the free acid groups, which can be subsequently neutralized after prepolymer formation.

Suitable materials for introducing acid groups, when preparing the prepolymer, are organic compounds having at least one active hydrogen atom and at least one group capable of salt formation. Specific examples of these compounds are hydroxy, aminohydroxy, amino and mercaptocarboxylic acids, sulphonic acids, hydroxy and amino sulphonic acids such as dimetylol propionic acid, oxaluric acid, anilido acetic acid, hydroxyethyl propionic acid, dihydroxy maleic acid, dihydroxy tartaric acid, 2,6-dihydroxybenzoic acid, glycollic acid, thioglycollic acid, glycine, alpha alanine, 6-amino caproic acid, 2-hydroxyethane sulphonic acid, 4,6-diamino benzene, 1,3-disulphonic acid, 2-amino diphenylamino sulphonic acid, and the like.

Suitable salt forming agents for acid groups containing compounds include inorganic and organic bases such as sodium hydroxides, potassium hydroxide, ammonia and tertiary amines.

Suitable chain extenders having at least two active hydrogen atom more reactive with NCO-groups than water are for instance ammonia, primary and secondary amines, preferably diamines, and certain organic polyols, preferably diols. Examplary for these compounds are hydrazine, substituted hydrazines, e.g. dimethylhydrazine, 1,6-hexamethylene bishydrazine, hydrazides of dicarboxylic and disulphonic acids, reaction products of hydrazine with lactones and glycols, ethylene diamine, hexamethylene diamine, isophorone diamine, diaminophenyl methane, ethylene glycol, di-, tri- and tetraethylene glycol, propane 1,2-diol, propane 1,3-diol, neopentyl glycol. Also amino-alcohols and water may be used.

During the preparation of the acrylated urethane prepolymer one can have present any of the known catalysts, such as amines and organometal compounds for the urethane reaction. These catalysts are well-known and include triethylene diamine, morpholine, N-ethyl-morpholine, piperazine, triethanolamine, triethylamine, dibutyltin dilaurate, stannous octoate, dioctyltin diacetate, lead octoate, stannous oleate, stannous tallate, dibutyltin oxide, and the like.

The acrylated (i.e. acryl terminated) aqueous polyurethane dispersions, finally obtained via the route and based on the ingredients described before, are subjected to an emulsion polymerization.

The procedures, used to prepare the emulsion polymers are well-known in the art and generally involve admixing under rapid stirring the comonomer charge with water, surfactants, or emulsifying agents, a polymerization catalyst or initiator and eventually a chain transfer agent.

The mixture is then heated to polymerization temperature for the time required to substantially complete the emulsion polymer formation.

The polymerization can be carried out in equipment heretofore employed for emulsion polymerization whether or not under pressure, usually in an atmosphere of $N_2$, $CO_2$, inert gas and the like.

Many variations of the general preparative procedure are used to obtain for example lower viscosity, high solids content, improved freeze-thaw stability, etc.

The variations include for example the use of the pre-emulsion technique in which the monomer charge is first emulsified in water using a surfactant and then this pre-emulsion is added to the reaction mixture, which contains the remaining reactants. This procedure is the so-called "feed-addition" system. A variant in this procedure may consist therein, that a part of the monomer is seeded to start the reaction, after a certain reaction period followed by the feed-addition.

In this system the polymerization of the monomers is effected by the free radical catalysts (free radical formers or free radical forming systems), of which the half life time is dependent on the temperature.

Some well-known catalysts for example become active or decompose at the temperature used during the polymerization (thermal decomposition), others—especially those having a rather long half life time—are activated by means of a reducing agent (chemical decomposition) which, in the absence of oxygen, immediately produces free radicals. These redox couples can be used in feed-addition systems by adding the catalyst to the reaction mixture, being present in the reactor phase, and feeding the reducing agent simultaneously with the (whether or not pre-emulsified) monomer blend to achieve a better control of the polymerization reaction.

Other redox systems are based on free radical catalysts in combination with an, eventually chelatable, metal reducing agent, which effect the polymerization reaction already at low temperatures. These systems usually show a reaction exotherm even up to 70° C. or more, during which the polymerization is almost completed.

Generally, temperatures used during the polymerization should be sufficient to effect polymerization by activation of the catalyst and double bonds of the monomers. These temperatures should not be too high to cause a run-away reaction and not too low to retard polymerization.

In general redox systems perform well at temperatures already from 10° C. and feed-addition systems at temperatures from 50° C. to about 110° C.

When applying these emulsion polymerization techniques in the present invention (step 4), the acrylated aqueous polyurethane dispersion is introduced into the reactor phase.

The pre-emulsified monomers, if present, being present in the urethane dispersion, can be considered as the seeded part of the monomer feed when applying the seeding/feeding technique. During the emulsion polymerization reaction the acrylated aqueous polyurethane dispersion surprisingly appears to function as a conventional monomer: extraction tests, carried out as described before, indicate that this compound for the greater part is incorporated in the growing acrylate polymer chain.

The polymerizable vinyl monomers, useful in the process of the invention, can be nitrile like acrylonitrile, methacrylonitrile; an amide like acrylamide, methacrylamide, n-methylolacrylamide, ethacrylamide; an acrylate like methylacrylate, ethylacrylate, butylacrylate, 2-ethyl hexylacrylate; an alkyl acrylate like methyl methacrylate, ethyl methacrylate, butyl methacrylate; an acid like acrylic acid, methacrylic acid, maleic acid, malonic acid, itaconic acid; an aromatic like styrene, vinyl toluene, α-methyl styrene, methyl vinyl toluene; a pyridine like 2- or 4-vinyl pyridine, 2-methyl-5-pyridine and 5-ethyl-2-vinyl pyridine, and the like and mixtures thereof.

It is known that the introduction of small quantities of multifunctional acrylate monomer into the copolymer sometimes improves the properties of coatings resins. Examplary preferred multifunctional acrylate compounds include ethylene glycol diacrylate, glycerol diacrylate, 1,4-cyclohexane-diol-diacrylate, 1,4-benzene-diol dimethacrylate, pentaerythritol triacrylate and the like and mixtures thereof. See for both types of monomers also "Polymer Handbook" second edition, published by John Wiley & Sons, New York, 1974, pages II-105 and II-387.

Suitable free radical catalysts are ammonium, sodium and potassium persulphate, bis(2-ethylhexyl)peroxydicarbonate, di-n butyl peroxy-dicarbonate, t-butyl perpivalate, t-butyl hydroperoxide, cumene hydroperoxide, dibenzoyl peroxide, dilauroyl peroxide, 2,2'-azo-bis isobutyronitrile, 2,2'-azobis-2-methylbutyronitrile and the like and mixtures of the same. See also the free radical catalysts as described in p.e. "Polymer Handbook", mentioned before, and in the Encyclopedia of Polymer Science and Technology", Interscience Publishers, a division of John Wiley & Sons, Inc., New York, Vol. 2 (1965), Vol. 3 (1965), Vol. 7 (1967) and Vol. 9 (1968).

Suitable reducing agents, most commonly used, are for example ascorbic acid, sodium sulphoxylate formaldehyde, thiosulphates, bisulphates, hydrosulphates, water-soluble amines, such as diethylene triamine, triethylene tetramine, and tetraethylene pentamine, and reducing salts as the sulphates of metals, which are capable of existing in more than one valence state like cobalt, iron, nickel, copper, etc.

From the many types of chain transfer agents or modifiers been proposed, it is preferred to use the alkyl and/or aralkyl mercaptans having from 8 to 18 carbon atoms, such as n-octyl mercaptan, t-dodecyl mercaptan and so forth and mixtures thereof.

Emulsifiers such as soaps, surfactants or dispersing agents, being useful in the process of the invention, are used in amounts sufficient to obtain a stable aqueous dispersion of the water and the monomers together with the dispersed acrylated urethane polymer and can be of the anionic or non-ionic types, commonly employed, as well as mixtures thereof. Generally, the anionic types perform better than the non-ionic types do.

Examples of the anionic types are potassium laurate, potassium stearate, potassium oleate, sodium dodecyl sulphate, sodium decyl sulphate, sodium rozinate and the like.

Examples of the non-ionic types are ethylene oxide and propylene oxide condensates in general, e.g. straight and branched chain alkyl and alkylaryl polyethylene glycol and polypropylene glycolethers and thioethers. Also substances which are members of a homologous series of alkylphenoxypoly(ethyleneoxy) ethanols and the like approved to be suitable.

See also "McCutcheon's Detergents & Emulsifiers", 1974, North American Edition, published by McCutcheon's Division, Allured Publishing Corporation, New Jersey.

The process of the invention is illustrated in more detail by means of the following examples, however, without any limitation thereto.

Unless otherwise noted all amounts are indicated in parts by weight.

The given equivalent data are gram-equivalents.

EXAMPLE I (Comparative example)

This example concerns the preparation of an aqueous dispersion of an acrylate/urethane graft/copolymer, where the HEMA is introduced in the reaction mixture after finishing the preparation of the urethane prepolymer.

There were charged to a two liter fourneck round bottom flask, equipped with a thermometer, mechanical stirrer, air condenser, dry air or nitrogen blanket, dropping funnel and heating mantle 547.6 grams of 4,4'-methylene bis(cyclohexyl)diisocyanate, 597 grams of a polypropylene glycol having a hydroxyl number of 55.6 mg KOH/g, 338.4 grams of a polypropylene glycol having a hydroxyl number of 111.4 mg KOH/g and 55.4 grams of dimethylol propionic acid.

The mixture was mixed during 10 minutes, whereafter 0.2 g dibutyltin dilaurate as catalyst was added. Thereafter the reaction mixture was heated to 55°-65° C., which temperature was increased by the exothermic reaction to 95° C., kept at 95° C. for one hour to complete the reaction and subsequently cooled to about 60° C. At this temperature, while stirring the reaction mixture, 20.4 g of 2-hydroxyethyl methacrylate was added dropwise. The reaction mixture was then stirred and heated at a temperature of 60° C. (±2° C.) for 2 hours.

To this mixture were charged 41 g of triethylamine, as neutralizing agent, dissolved in a monomer blend of 100 g of methyl methacrylate and 300 g of N-butylacrylate and reacted for half an hour. After this reaction the acrylate terminated urethane prepolymer, thus obtained, was cooled to about 30°-40° C.

In a comparable equipment under a nitrogen blanket (or other inert gas) 296.1 g of the prepolymer, thus obtained, was added over a period of one hour to a reaction mixture containing 619.6 g of demineralized water and 67.3 g of sodium lauryl sulphate (solids content 32%) at ambient temperature. Immediately after finishing the prepolymer feeding 6.5 g of hydrazine monohydrate was added to the obtained dispersion. This mixture was reacted for half an hour, whereafter 2.1 g of potassium persulphate and 2.7 g of sodium bicarbonate, dissolved in 526.3 g of demineralized water, were charged.

The reaction mixture, thus obtained, was heated to about 90° C., at which temperature a monomer blend of 119.9 g of methyl methacrylate and 359.9 g of N-butyl methacrylate were added over a period of one hour, whereafter the temperature was maintained at 90° C. for another half an hour. The aqueous acrylate urethane graftcopolymer dispersion, thus obtained, showed the following specifications:

| | |
|---|---|
| solids content | 40.20% |
| pH | 8.23 |
| Brookfield viscosity (25° C.) | 88 m.Pa.s. |
| free monomer content | 0.50% |
| coagulum content | 0.15% |

Soxhlet extraction of the dried polymer with tetrahydrofuran over a period of 24 hours left about 62% of not extracted material. Converting this value to a percentage not extracted acrylate compounds on total input of acrylate monomers a value of about 50% was found. So about 50% of the acrylate monomers approved to be coupled to the acrylate terminated urethane polymer.

Storage stability:

| | |
|---|---|
| Freeze-thaw (7 cycles 8 hours −20° C. and 16 hours 20° C.) | very bad |
| at 4° C. (7 cycles of 16 hours 4° C. and 8 hours 20° C.) | bad |
| at room temperature (4 weeks) | good |
| at 52° C. (4 weeks) | good |

Because of a bad film formation the film properties could not be determined.

EXAMPLE II (Comparative example)

Herein the polyurethane dispersion and the acrylate polymer are prepared independently and then they are mixed.

The procedure of this preparation is more or less comparable with comparative example I.

There are the following modifications:
diisocyanate: isophorone diisocyanate
the urethane prepolymer was diluted with N-methylpyrrolidone
the urethane prepolymer was dispersed without an emulsifier.

Components for the urethane prepolymer preparation:

| | |
|---|---|
| N—methypyrrolidone | 200.0 |
| isophorone diisocyanate | 708.5 |
| polypropylene glycol (OH = 56.0) | 768.5 |
| polypropylene glycol (OH = 110.0) | 442.2 |
| dimethylol propionic acid | 80.6 |
| dibutyltin dilaurate | 0.2 |
| | 2200.0 g |

To 2,200.0 g prepolymer are added 33.3 g of 2-hydroxyethyl methacrylate and heated to 50°-60° C., followed by cooling of the acrylated prepolymer after 2 hours reaction.

Components for dispersion and extension:

| | |
|---|---|
| prepolymer | 876.4 |
| triethylamine | 23.8 |
| hydrazine monohydrate | 28.1 |
| demineralized water | 1071.7 |
| | 2000.0 g |

Components acrylate polymer preparation:

| | |
|---|---|
| demineralized water | 1064.3 |
| ammonium persulphate | 1.7 |
| sodium laurylsulphate (32%) | 54.4 |
| N—butyl methacrylate | 650.7 |
| methyl methacrylate | 228.9 |
| | 2000.0 g |

Components for mixing the PUR-dispersion with the acrylate polymer:

| | |
|---|---|
| PUR-dispersion | 499.8 |
| acrylate polymer | 1084.9 |
| demineralized water | 415.3 |
| | 2000.0 g |

Specifications PUR-polyacrylate physical mixture:

| | |
|---|---|
| solids content | 35.5% |
| pH | 8.4 |
| Brookfield viscosity (25° C.) | 15.0 m.Pa.s. |
| free monomers content | 0.05% |
| sediment content | 0.03% |
| Soxhlet extraction | 3% residue on total input. |

Film formation:

| | |
|---|---|
| minimum film formation temperature | 20° C. |
| appearance | clear, colourless, smooth |

Film properties:

| | |
|---|---|
| structure | brittle/very breakable |
| Konig hardness | 93 sec |
| Resistances: | |
| water | moderate |
| toluene | bad |
| acetone | very bad |
| ethanol | very bad |
| N—methylpyrrolidone | very bad |
| Storage stabilities: | |
| Freeze-thaw | very bad |
| at 4° C. | bad |
| at room temperature | good |
| at 52° C. | moderate |

EXAMPLE III

There were charged to a two liter fourneck round bottom flask, equipped with a thermometer, mechanical stirrer, air condenser, dry air or nitrogen blanket, dropping funnel and heating mantle, 557.8 g of 4,4′-methylene bis(cyclohexyl) diisocyanate (Desmodur W ®). The reactor phase was then heated to 95° C. at which temperature 18.5 g of 2-hydroxyethyl methacrylate were added dropwise over a period of one hour, which mixture was kept at this temperature for another half an hour and subsequently cooled down to 60° C. The Desmodur W ®—HEMA adduct had the following composition (GPC peak area ratio): Desmodur W ®/HEMA:HEMA/Desmodur W ®/HEMA=90:10.

To this mixture were then charged 603.9 g of a polypropylene glycol having a hydroxyl number of 55.6 mg KOH/g, 340 g of a polypropylene glycol having a hydroxyl number of 111.4 mg KOH/g and 62.8 g of dimethylol propionic acid. The mixture was mixed during 10 minutes, whereafter 0.8 g of dibutyltin dilaurate as catalyst was added.

Thereafter the reaction mixture was heated to 55°–65° C., which temperature was increased by the exothermic reaction to 95° C., kept at 95° C. for one hour to complete the reaction and subsequently cooled to 60° C.

To this mixture were charged 46.5 g of triethylamine, as neutralizing agent, dissolved in a monomer blend of 92.4 g of methyl methacrylate and 277.2 g of N-butyl methacrylate, which mixture was reacted for half an hour and subsequently cooled down to 30°–40° C.

In a comparable equipment under a nitrogen (or other inert gas) blanket 316.3 g of the prepolymer, thus obtained, were added over a period of one hour to a reaction mixture containing 530 g of demineralized water and 52.5 g of sodium laurylsulphate (solids content 32%) at ambient temperature. Immediately after finishing the prepolymer feeding 6.8 g of hydrazine monohydrate were added to the obtained dispersion. This mixture was reacted for half an hour, whereafter 2.3 g of potassium persulphate, dissolved in 624.6 g of demineralized water, were charged.

The reaction mixture, thus obtained, was heated to about 90° C. under nitrogen (or another inert gas) atmosphere, sphere, at which temperature a monomer blend of 116.9 g of methyl methacrylate and 350.6 g of N-butyl methacrylate were added over a period of one hour, whereafter the temperature was maintained at 90° C. for another half an hour. The aqueous acrylate urethane graftcopolymer dispersion, thus obtained, showed the following specifications:

| solids content | 39.6% |
|---|---|
| pH | 7.47 |
| Brookfield viscosity (25° C.) | 86 m.Pa.s. |
| free monomer content | 0.20% |
| coagulum content | 0.04% |
| Soxhlet extraction | 76% residue on total output, (corresponding with 76% acrylate on acrylate input) |

Storage stabilities:

| Freeze-thaw | very bad |
|---|---|
| (7 cycles of 8 hours −20° C. and 16 hours 20° C.) | |
| at 4° C. | bad |
| (7 cycles of 16 hours 4° C. and 8 hours 20° C.) | |
| at room temperature (4 weeks) | good |
| at 52° C. (4 weeks) | very good |

Film formation:

| minimum film formation temperature | <18° C. |
|---|---|
| appearance | clear, smooth, colourless. |

Film properties:

| structure | tough, flexible, not elastic |
|---|---|
| Konig hardness | 60 sec |
| Resistances: | |
| water | bad |
| toluene | bad |
| acetone | moderate |
| ethanol | good |
| N—methylpyrrolidone | bad. |

EXAMPLE IV

The procedure was identical to example III; the urethane polymer, however, was based on isophorone diisocyanate.

Components for the partially acrylated urethane prepolymer (given in grams):

| isophorone diisocyanate | 486.7 |
|---|---|
| 2-hydroxy ethyl methacrylate | 18.9 |
| polypropylene glycol | 648.8 |
| (OH = 55.6 mg KOH/g) | |
| polypropylene glycol | 391.7 |
| (OH = 108.7 mg KOH/g) | |
| dimethylol propionic acid | 69.1 |
| dibutyltin dilaurate | 0.8 |
| triethylamine | 7.4 |
| methyl methacrylate | 94.2 |
| N—butyl methacrylate | 282.4 |
| | 2000.0 g |

The isophorone diisocyanate-HEMA adduct had the following composition (GPC peak area ratio): IPDI/-HEMA:HEMA/IPDI/HEMA=95:5.

The prepolymer thus obtained was dispersed and extended comparably to example III.

Components (in grams):

| prepolymer | 295.6 |
|---|---|
| hydrazine monohydrate | 5.5 |
| sodium laurylsulphate (32%) | 48.9 |
| demineralized water | 492.3 |
| | 842.3 g |

Also according to the procedure, described in example III, this aqueous acrylate terminated polyurethane dispersion was copolymerized with acrylate monomers, components (in grams):

| acrylated PU-dispersion | 842.3 |
|---|---|
| methyl methacrylate | 122.6 |
| N—butyl methacrylate | 367.7 |
| potassium persulphate | 2.7 |
| demineralized water | 664.7 |
| | 2000.0 g |

The aqueous acrylate urethane graftcopolymer dispersion, finally obtained, showed the following specifications:

| solids content | 39.6% |
|---|---|
| pH | 7.6 |
| Brookfield viscosity (25° C.) | 28 m.Pa.s. |
| free monomer content | 0.15% |
| coagulum content | <0.02% |
| Soxhlet extraction | 88% residue on total input, (corresponding with 88% acrylates on acrylate input). |

Storage stabilities:

| Freeze-thaw | very good |
|---|---|
| at 4° C. | very good |
| at room temperature | very good |
| at 52° C. | very good |

Film formation:

| minimum film formation temperature range | 23-25° C. |
|---|---|
| appearance | clear, colourless, smooth. |

Film properties:

| Structure | tough, flexible, not elastic |
|---|---|
| Konig hardness | 86 sec |
| Resistances | |
| water | good |
| toluene | good |
| acetone | good |
| ethanol | good |
| N—methylpyrrolidone | good |

EXAMPLE V

The procedure was comparable with example III. The following modifications are introduced:
Diisocyanate: isophorone diisocyanate
In the acrylic part acid fuctionality was incorporated via copolymerization of a slight amount of methacrylic acid: 5%, by weight, on the total amount of monomers.

The copolymerization was initiated by the addition of ammonium persulphate to the acrylated PU-dispersion, cumene hydroperoxide to the acrylate monomers to be introduced and by use of an independent reductor feed of i-ascorbinic acid.

The acrylate monomers were metered in one hour at 70°-75° C., followed by a post-reaction of half an hour at 75°-80° C.

For the copolymerization an additional emulsifier was added; alkylphenoxy poly(ethylene-oxy) ethyl mono- and di-esters of phosphoric acid, commercially available under the name Gafac RE-610 ®.

After the copolymerization the pH was increased to a value of about 8 by means of diluted ammonia.
Components for the acrylated urethane prepolymer (in grams):

| isophorone diisocyanate | 486.7 |
|---|---|
| 2-hydroxy ethyl methacrylate | 18.9 |
| polypropylene glycol (OH = 55.6 mg KOH/g) | 648.8 |
| polypropylene glycol (OH = 108.7 mg KOH/g) | 391.7 |
| dimethylol propionic acid | 69.1 |
| dibutyltin dilaurate | 0.8 |
| triethylamine | 7.4 |
| methyl methacrylate | 94.2 |
| N—butyl methacrylate | 282.4 |
| | 2000.0 g |

The prepolymer, thus obtained, was dispersed and extended comparably to example III.
Components (in grams):

| prepolymer | 295.6 |
|---|---|
| hydrazine monohydrate | 5.5 |
| sodium laurylsulphate (32%) | 48.9 |
| demineralized water | 492.3 |
| | 842.3 g |

To the acrylated PU-dispersion there was added, according to the following components, ammonium persulphate, Gafac RE-610 and demineralized water. After heating the reaction mixture to 70° C. the mixture of N-butyl methacrylate, methyl methacrylate, methacrylic acid and cumene hydroperoxide is added at 70°-75° C. during one hour. Simultaneously, a 1% solution of iso-ascorbic acid is added separately.

Hereafter a post-reaction of half an hour was carried out at 75°-80° C.
Components (in grams):

| acrylated PU-dispersion | 808.7 |
|---|---|
| ammonium persulphate | 2.7 |
| Gafac RE-610 (100%) | 15.4 |
| demineralized water | 686.8 |
| N—butyl methacrylate | 366.5 |
| methyl methacrylate | 88.5 |
| methacrylic acid | 26.5 |
| cumene hydroperoxide (80%) | 3.3 |
| iso-ascorbic acid | 1.6 |
| | 2000.0 g |

The urethane acrylate graftcopolymer had the following specifications after adjusting the pH on about 8:

| solids content | 39.4% |
|---|---|
| pH | 7.8 |
| Brookfield viscosity (25° C.) | 15 m.Pa.s. |
| free monomers content | 0.16% |
| coagulum content | 0.02% |
| Soxhlet extraction | 89% residue on total input (corresponding with 89% acrylates on acrylate input) |

Storage stabilities:

| Freeze-thaw | very good |
|---|---|
| at 4° C. | very good |
| at room temperature | good |
| at 52° C. | very good |

Film formation:

| | |
|---|---|
| minimum film formation temperature range | 24–26° C. |
| appearance | clear, colourless, smooth. |

Film properties:

| | |
|---|---|
| structure | tough, flexible, not elastic |
| Konig hardness | 90 sec |
| Resistances: | |
| water | good |
| toluene | moderate |
| acetone | good |
| ethanol | moderate |
| N—methylpyrrolidone | moderate. |

EXAMPLE VI

The procedure is comparable with example III.
The following modifications are introduced:
Diisocyanate: isophorone diisocyanate.
In the urethane prepolymer preparation it is started from a polyester instead of a polyether combination.

For the urethane prepolymer preparation 10% N-methylpyrrolidone was required in order to reduce the viscosity.

In the copolymerization the acid incorporation, initiation, reaction temperature, reaction time, the use of an additional emulsifier and the pH increase were the same as in example V.

The post-reaction was carried out with 17% of the cumene hydroperoxide and 25% of the i-ascorbic acid amount: half an hour at 75°–80° C.

Components acrylated urethane prepolymer preparation (in grams):

| | |
|---|---|
| isophorone diisocyanate | 394.6 |
| 2-hydroxyethyl methacrylate | 15.4 |
| polyester (adipinic acid/1,6-hexanediol/ neopentyl glycol OH & Ac = 59.3) | 1029.6 |
| N—methylpyrrolidone | 150.0 |
| dimethylol propionic acid | 59.4 |
| dibutyltin dilaurate | 0.7 |
| N—butyl methacrylate | 262.5 |
| methyl methacrylate | 87.5 |
| | 2000.0 |

For the isophorone diisocyanate-HEMA adduct the following composition was found (GPC peak area ratio): IPDI/HEMA:HEMA/IPDI/HEMA=95:5.

The prepolymer was dispersed and extended according to example III.

Components (in grams):

| | |
|---|---|
| prepolymer | 300.8 |
| triethylamine | 6.6 |
| hydrazine monohydrate | 4.8 |
| sodium laurylsulphate (32%) | 47.5 |
| demineralized water | 457.6 |
| | 817.3 g |

Components copolymerization (in grams):

| | |
|---|---|
| acrylated PU-dispersion | 817.3 |
| ammonium persulphate | 1.1 |
| N—butyl methacrylate | 226.6 |
| methyl methacrylate | 223.4 |
| methacrylic acid | 26.5 |
| cumene hydroperoxide (80%) | 4.0 |
| iso-ascorbic acid | 2.1 |
| Gafac RE-610 (20%) | 124.1 |
| demineralized water | 574.9 |
| | 2000.0 g |

The urethane acrylate graftcopolymer had the following specifications after adjusting the pH on a value of about 8:

| | |
|---|---|
| solids content | 38.2% |
| pH | 7.6 |
| Brookfield viscosity (25° C.) | 12 m.Pa.s. |
| free monomers content | 0.40% |
| coagulum content | 0.02% |
| Soxhlet extraction | 87% residue on total input. |

Storage stabilities:

| | |
|---|---|
| Freeze-thaw | good |
| at 4° C. | good |
| at room temperature | very good |
| at 52° C. | very good |

Film formation:

| | |
|---|---|
| minimum film formation temperature range | 39–44° C. |
| appearance | clear, colourless, moderate, pinholes. |

Film properties:

| | |
|---|---|
| structure | slightly breakable |
| Konig hardness | 92 sec |
| Resistances: | |
| water | very good |
| toluene | moderate |
| acetone | good |
| ethanol | bad |
| N—methylpyrrolidone | moderate. |

EXAMPLE VII

The procedure is comparable with example III.
The following modifications are introduced:
Diisocyanate: isophorone diisocyanate.
Coupling agent: 2-hydroxyethyl acrylate
Reaction temperature adduct preparation: 50°–55° C.

The acrylate part was composed as follows: styrene/n-butylmethacrylate/methyl methacrylate/methacrylic acid=43.6/48.9/2.5/5.0 (in %, by weight).

For the copoplymerization an additional emusifier was added; alkylphenoxy poly(ethylene-oxy)ethyl mono- and diesters of phosphoric acid, commercially available under the name Gafac RE-610 ®.

After the copolymerization a post-reaction was carried out with cumene hydroperoxide and iso-ascorbic acid. Also an additional amount of sodium laurylsulphate was added. Reaction temperature of 60°–65° C., reaction time half an hour.

The pH of the copolymer was adjusted to a value of 8 by means of diluted ammonia.

Components for the acrylated urethane prepolymer (in grams):

| | |
|---|---|
| isophorone diisocyanate | 489.7 |
| 2-hydroxyethyl acrylate | 17.0 |
| polypropylene glycol (OH = 55.6) | 647.4 |
| polypropylene glycol (OH = 198.6) | 396.9 |
| dimethylol propionic acid | 69.5 |
| dibutyltin dilaurate | 0.8 |
| N—butyl methacrylate | 284.1 |
| methyl methacrylate | 94.6 |
| | 2000.0 g |

For the isophorone diisocyanate-HEA adduct the following composition was found (GPC—peak area ratio): IPDI/HEA:HEA/IPDI/HEA=93:7.

Components for the dispersion and extension of the urethane prepolymer (in grams):

| | |
|---|---|
| prepolymer | 646.8 |
| triethylamine | 17.7 |
| hydrazine monohydrate | 4.3 |
| sodium laurylsulphate (32%) | 109.7 |
| demineralized water | 48.2 |
| | 826.7 g |

Components copolymerization (in grams):

| | |
|---|---|
| acrylated PU-dispersion | 826.7 |
| ammonium persulphate | 2.7 |
| N—butyl methacrylate | 220.4 |
| styrene | 232.2 |
| methacrylic acid | 26.6 |
| Gafac RE-610 ® (20%) | 76.4 |
| sodium laurylsulphate (32%) | 1.7 |
| cumene hydroperoxide (80%) | 1.3 |
| iso-ascorbic acid | 1.1 |
| demineralized water | 610.9 |
| | 2000.0 g |

The obtained aqueous urethane acrylate dispersion had the following specifications:

| | |
|---|---|
| solids content | 39.6% |
| pH | 8.0 |
| Brookfield viscosity (25° C.) | 43.0 m.Pa.s. |
| free monomers content | 0.08% |
| coagulum content | 0.02% |
| Soxhlet extraction | 91%, residue on total input. |

Storage stabilities:

| | |
|---|---|
| Freeze-thaw | good |
| at 4° C. | good |
| at room temperature | good |
| at 52° C. | good |

Film formation:

| | |
|---|---|
| minimum film formation temperature range | 22-30° C. |
| appearance | clear, a little yellowish, smooth. |

Film properties:

| | |
|---|---|
| structure | tough, flexible, not elastic |
| Konig hardness | 80 sec |
| Resistances: | |
| water | good |
| toluene | moderate |
| acetone | moderate |
| ethanol | good |
| N—methylpyrrolidone | moderate. |

EXAMPLE VIII

The procedure is comparable with example III.
Modifications:
Diisocyanate: toluene diisocyanate.
Coupling agent: tertiary butylamino-ethyl methacrylate (TBAEMA). Reaction temperature adduct preparation: 25°-30° C.

The initiation, reaction temperature and reaction time in the copolymerization were the same as in example V.
The following post-reactions were carried out:
a. with 50% of the indicated amount of ammonium presulphate; half an hour reaction at 90° C.
b. with sodium sulphoxylate formaldehyde and tertiary butyl hydroperoxide; half an hour at 60°-65° C.

Components for the acrylated urethane prepolymer preparation (in grams):

| | |
|---|---|
| toluene diisocyanate | 407.6 |
| tertiary butylamino-ethyl methacrylate | 29.0 |
| polypropylene glycol (OH = 55.6 mg KOH/g) | 688.5 |
| polypropylene glycol (OH = 108.7 mg KOH/g) | 422.2 |
| dimethylol propionic acid | 73.9 |
| N—butyl methacrylate | 284.2 |
| methyl methacrylate | 94.6 |
| | 2000.0 g |

Composition TDI-TBAEMA adduct: TDI/TBAEMA:TBAEMA/TDI/TBAEMA=88:12 (GPC peak area ratio).

The prepolymer was dispersed and extended in accordance with example III.

| | |
|---|---|
| prepolymer | 284.8 |
| triethylamine | 7.8 |
| hydrazine monohydrate | 4.9 |
| sodium laurylsulphate (32%) | 48.3 |
| demineralized water | 488.3 |
| | 834.1 g |

Preparation copolymer (procedure according to example III).

| | |
|---|---|
| acrylated PU-dispersion | 834.1 |
| ammonium persulphate | 2.2 |
| iso-ascorbic acid | 1.6 |
| cumene hydroperoxide (80%) | 3.4 |
| N—butyl methacrylate | 763.7 |
| methyl methacrylate | 121.2 |
| sodium sulphoxylate formaldehyde | 1.1 |
| tertiary butyl hydroperoxide (79%) | 1.5 |
| demineralized water | 671.2 |
| | 2000.0 g |

Specifications urethane acrylate dispersion:

| | |
|---|---|
| solids content | 37.8% |
| pH | 7.0 |
| Brookfield viscosity (25° C.) | 12.0 m.Pa.s. |
| free monomers content | 1.3% |
| coagulum content | 0.02% |
| Soxhlet extraction | 86% residue on total input. |

Storage stabilities:

| | |
|---|---|
| Freeze-thaw | very bad |
| at 4° C. | bad |
| at room temperature | moderate |
| at 52° C. | moderate |

Film formation:

| | |
|---|---|
| minimum film formation temperature | <20° C. |
| appearance | clear, slightly yellowish, smooth. |

Film properties:

| | |
|---|---|
| structure | tough, flexible, not elastic |
| Konig hardness | 50 sec |
| Resistances: | |
| water | moderate |
| toluene | good |
| acetone | good |
| ethanol | moderate |
| N—methylpyrrolidone | moderate |

What is claimed is:

1. A process for preparing aqueous dispersions of urethane-acrylate graft copolymers, characterized in that
   a. a monoacrylated adduct is prepared by reaction of a polymerizable acrylate, containing at least one active hydrogen atom with a diisocyanate to produce an essentially monoacrylated diisocyanate adduct in the presence of excess diisocyanate, the NCO/OH equivalent ratio to produce the adduct is from about 2:1 to about 30:1,
   b. the thus obtained adduct together with other polyisocyanates is reacted with an organic compound, containing at least one active hydrogen atom and an organic compound containing at least one active hydrogen atom and a group which is capable of forming a salt group, said organic compounds having an average isocyanate-reactive functionality of 2,
   c. the thus obtained prepolymer is neutralized and is dispersed in water, immediately followed by the addition of a chain extender thereby obtaining a chain-extended acrylated urethane polymer dispersion, and
   d. the thus obtained dispersion is used in an emulsion polymerization thereby obtaining a stable aqueous dispersion of urethane-acrylate graft copolymer.

2. The process according to claim 1, characterized in that the conversions in a. and b. are carried out in a dry atmosphere and at a temperature of about 0°–130° C. and about 50°–130° C. respectively.

3. The process according to claim 2, characterized in that the conversion in a. is carried out at a temperature of about 20°–100° C., and in b. at a temperature of about 80°–95° C.

4. The process according to claim 1, characterized in that as active hydrogen atom containing polymerizable acrylate one uses acrylates which contain at least one —OH, —SH, >NH or —NH₂ group.

5. The process according to claim 1, characterized in that the adduct in a. is prepared by converting a diisocyanate with a hydroxy-acrylate in a NCO:OH equivalent ratio of from about 10:1 to about 30:1, whereas the conversion in b. is carried out at a NCO:OH equivalent ratio of 1,2:1 to 2,5:1.

6. The process according to claim 5, characterized in that the conversion in a. is carried out at a NCO:OH ratio of 10:1 to 30:1, whereas the conversion in b. is carried out at a NCO:OH ratio of 1,6:1 to 2,3:1.

7. The process according to any one of claims 1–6, characterized in that the equivalent weight based on the salt forming group in b. is less than about 6000.

8. The process according to claim 7, characterized in that the equivalent weight is about 200–5000.

9. The process according to claim 1, characterized in that the conversion in b. is carried out whether or not in the presence of a catalyst.

10. The process according to claim 9, characterized in that the conversion in b. is carried out in the presence of a catalyst.

11. The process according to claim 10, characterized in that the catalyst is present in an amount of about 0,001–0,1% by weight.

12. The process according to claim 10 or 11, characterized in that as catalyst an amine or an organo metal compound is used.

13. The process according to claim 1, characterized in that the prepolymer as prepared in b. is diluted with one or more polymerizable compounds under obtaining a prepolymer viscosity of 10–10.000 mPa.s.

14. The process according to claim 13, characterized in that as polymerizable compound an acrylate monomer is used.

15. The process according to claim 1, characterized in that the neutralization in c. is carried out at a neutralization percentage of about 50–130% on equivalent base.

16. The process according to claim 15, characterized in that the neutralization is carried out directly in the prepolymer, followed by dispersion in water.

17. The process according to claim 15, characterized in that the neutralization is carried out during the dispersion of the prepolymer in a solution of neutralizing agent in water.

18. The process according to claim 1, characterized in that as neutralizing agent a tertiary amine is used.

19. The process according to claim 1, characterized in that in c. as chain-extender a compound having at least two active hydrogen atoms is used, which hydrogen atom should be more reactive with NCO-groups than the hydrogen atom of water.

20. The process according to claim 19, characterized in that as chain-extender a primary organic amine or a secondary organic amine is used.

21. The process according to claim 19 or 20, characterized in that the equivalent ratio between the NCO-groups in the prepolymer and the active hydrogen atoms in the chain-extender is less than 2:1.

22. The process according to claim 21, characterized in that the equivalent ratio is 1,0:1 to 1,8:1.

23. The process according to claim 1, characterized in that the acrylated urethane-polymerdispersion obtained through chain extension in c. has a solids content of about 20–80%, by weight.

24. The process according to claim 23, characterized in that said dispersion has a solids content of 30–40%, by weight.

25. The process according to claim 1, characterized in that the emulsion polymerization in d. is carried out with an acrylate and/or a related monomer.

26. The process according to claim 25, characterized in that the emulsion polymerization is carried out by the use of a conventional technique, with or without pressure and whether or not in an inert atmosphere.

27. The process according to claim 25 or 26, characterized in that the solids ratio between the acrylate and urethane content is 95:5 to 5:95.

28. The process according to claim 1, characterized in that the stable aqueous dispersion obtained in d. has a solids content of about 30–70%, by weight.

29. The process according to claim 28, characterized in that the aqueous dispersion has a solids content of about 40%, by weight.

* * * * *

UNITED STATES PATENT AND TRADEMARK OFFICE
CERTIFICATE OF CORRECTION

PATENT NO. : 4,730,021
DATED : March 8, 1988
INVENTOR(S) : Walter M.W. Zom et al It is certified that error appears in the above-identified patent and that said Letters Patent is hereby corrected as shown below:

Col. 3, line 27, correct the spelling of "copolymer".

Col. 8, line 47, correct the designation of "=NH".

Col. 9, line 37, correct the spelling of "dimethylol".

Col. 15, line 38, strike ", sphere," (second occurrence).

Col. 17, line 45, correct the spelling of "functionality".

Col. 20, line 58, correct the spelling of "copolymerization" and "emulsifier".

Col. 22, line 25, correct the spelling of "persulphate".

Claim 4, line 4, correct the designation ">NH".

Signed and Sealed this

Thirtieth Day of August, 1988

Attest:

DONALD J. QUIGG

Attesting Officer

Commissioner of Patents and Trademarks